United States Patent
Lambert et al.

(10) Patent No.: US 8,783,752 B2
(45) Date of Patent: Jul. 22, 2014

(54) MOBILE DEVICE RETENTION AND CHARGING TRAY

(71) Applicant: Toyota Motor Engineering & Manufacturing North America, Inc., Erlanger, KY (US)

(72) Inventors: Michael R. Lambert, Ann Arbor, MI (US); Nicholas S. Sitarski, Ypsilanti, MI (US); Scott L. Weiss, Novi, MI (US); Jonathan J. Quijano, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/718,312

(22) Filed: Dec. 18, 2012

(65) Prior Publication Data

US 2014/0167438 A1 Jun. 19, 2014

(51) Int. Cl.
*B60R 13/00* (2006.01)

(52) U.S. Cl.
USPC ....................................................... 296/24.34

(58) Field of Classification Search
USPC ......... 296/24.34; 180/287; 320/103, 108, 109
See application file for complete search history.

(56) References Cited

U.S. PATENT DOCUMENTS

| | | | | |
|---|---|---|---|---|
| 2,690,216 A * | 9/1954 | Scott | | 220/350 |
| 4,809,897 A | 3/1989 | Wright, Jr. | | |
| 4,854,632 A * | 8/1989 | Kreuze et al. | | 296/37.12 |
| 6,672,554 B2 * | 1/2004 | Fukuo | | 248/311.2 |
| 6,673,409 B1 * | 1/2004 | Wheatley | | 428/40.1 |
| 6,883,852 B2 * | 4/2005 | Laskey | | 296/37.8 |
| 7,062,300 B1 * | 6/2006 | Kim | | 455/569.1 |
| 7,125,602 B2 * | 10/2006 | Wheatley | | 428/156 |
| 7,252,867 B2 * | 8/2007 | Wheatley | | 428/40.1 |
| 7,341,297 B2 * | 3/2008 | Nakamura et al. | | 296/24.34 |
| 7,475,954 B1 * | 1/2009 | Latunski | | 312/297 |
| 7,540,391 B2 * | 6/2009 | Kato | | 220/252 |
| 7,581,773 B2 * | 9/2009 | Strasser et al. | | 296/1.09 |
| 7,667,431 B2 | 2/2010 | Tilley et al. | | |
| D611,898 S | 3/2010 | Yang | | |
| 7,735,538 B2 * | 6/2010 | Ogawa | | 160/230 |
| 7,868,585 B2 | 1/2011 | Sarnowsky et al. | | |
| 7,923,088 B2 * | 4/2011 | Wheatley | | 428/40.1 |
| 7,954,871 B2 * | 6/2011 | Hipshier | | 296/24.34 |
| 8,007,020 B2 * | 8/2011 | Hipshier et al. | | 296/37.8 |
| 8,033,588 B2 * | 10/2011 | Luginbill et al. | | 296/24.34 |
| 8,110,269 B2 * | 2/2012 | Wheatley | | 428/40.1 |
| 8,124,216 B2 * | 2/2012 | Antonini | | 428/172 |
| 8,376,436 B2 * | 2/2013 | Nakamura et al. | | 296/24.34 |
| 8,485,581 B2 * | 7/2013 | McKnight et al. | | 296/24.34 |
| 8,490,846 B1 * | 7/2013 | Wheatley et al. | | 224/483 |

(Continued)

*Primary Examiner* — Kiran B Patel
(74) *Attorney, Agent, or Firm* — Dinsmore & Shohl LLP

(57) ABSTRACT

A console assembly for an automotive vehicle and use with a mobile device. The console assembly including a storage compartment having a floor, a pair of sidewalls, and a pair of end walls. An opening permits access into the storage area and a slidable top wall is operable to move between a covered position and a retracted position relative to the opening. An anti-slip surface is provided on the top wall and configured to receive the mobile device thereon. A wireless charging unit is also incorporated into and moveable with the top wall. The wireless charging unit is located immediately below the anti-slip surface. When the mobile device is placed on the anti-slip surface, the device is moveable with the top wall, between the covered position and retracted position, while being charged.

13 Claims, 4 Drawing Sheets

(56) References Cited

U.S. PATENT DOCUMENTS

| | | | |
|---|---|---|---|
| 8,573,665 B2 * | 11/2013 | Hipshier | 296/24.34 |
| 8,579,151 B2 * | 11/2013 | Kodama et al. | 220/812 |
| 8,579,348 B1 * | 11/2013 | Myers | 296/24.34 |
| 2002/0005424 A1 * | 1/2002 | Lange et al. | 224/539 |
| 2002/0070220 A1 * | 6/2002 | Kuehn et al. | 220/350 |
| 2004/0118851 A1 * | 6/2004 | Shinomiya | 220/345.1 |
| 2005/0252317 A1 * | 11/2005 | Ueki | 74/29 |
| 2006/0037713 A1 * | 2/2006 | Ichimaru et al. | 160/37 |
| 2006/0186696 A1 * | 8/2006 | Dobos et al. | 296/152 |
| 2007/0102463 A1 * | 5/2007 | Thomas | 224/275 |
| 2007/0152461 A1 * | 7/2007 | Joler et al. | 296/24.34 |
| 2010/0001151 A1 * | 1/2010 | Wheatley et al. | 248/206.2 |
| 2010/0264871 A1 * | 10/2010 | Matouka et al. | 320/108 |
| 2011/0006611 A1 * | 1/2011 | Baarman et al. | 307/104 |
| 2011/0156418 A1 | 6/2011 | Thorsell et al. | |
| 2013/0038280 A1 * | 2/2013 | Boundy et al. | 320/108 |
| 2013/0257363 A1 * | 10/2013 | Lota et al. | 320/108 |

* cited by examiner

MOBILE DEVICE RETENTION AND CHARGING TRAY

BACKGROUND

1. Field of the Invention

The present invention generally relates to automotive interiors. More specifically, the invention relates to the wireless charging of portable electronic devices in automotive vehicles.

2. Description of Related Art

The occupant compartment of an automotive vehicle is often provided with various compartments for the storage of items during driving of the vehicle. The most well-known of these compartments is the glovebox. More recently, console assemblies have been provided in vehicles wherein the console assembly includes a lid that is hinged at one end and raise so as to permit access into the storage area defined within the console assembly. With the above two compartments, the console lid or glovebox door allows for any articles placed therein to be concealed from view from outside of the vehicle. Alternatively, various open topped bins or trays have been provided within vehicles to allow for the placement of an article therein without concealing the article.

Increasingly, the occupants of an automotive vehicle rely upon mobile devices in their everyday lives. These devices include, most notably, the mobile phone. Mobile phones are generally placed within open bins or trays while the vehicle is being operated and when the device is not in use. One inconvenience of placing a mobile device in these trays or bins is that the device often moves around during operation of the vehicle, possibly resulting in wear and damage to the housing of the device, or more undesirably, the display screen of the device.

Additionally, many of today's mobile devices have relatively large display screens enabling the display screen to be viewed when an activity occurs (such as an incoming telephone call) and allowing the device's owner to make a decision on how to respond to the activity (such as answering the incoming telephone call). Unfortunately, the permitted movement of the mobile device during operation of the vehicle often results in in the display screen of the device not being properly oriented with respect to the device owner for viewing when an activity occurs.

An additional limitation with mobile devices is that they rely upon battery power. Thus, it often occurs during travel of long duration that the mobile device loses its charge or decreases discharged to a point where it must be immediately recharged upon reaching the vehicle occupant's destination. Obviously, this may be very intermediate to the occupants and may not be immediately possible.

SUMMARY

Accordingly, in one aspect a console assembly is provided for an automotive vehicle and use with a mobile device. The console assembly includes a storage compartment having a storage area defined by a floor, a pair of sidewalls, and a pair of end walls. The storage compartment has an opening permitting access in the storage area. The storage compartment also has a slidable top wall that is operable to be slid between a covered position and a retracted position relative to the opening. When in the covered position, the top wall is in a position covering opening and, when in the retracted position, the top wall is in a position permitting access into the storage area through the opening. An anti-slip surface is provided on the top wall and configured to receive the mobile device thereon. Also, a wireless charging unit is incorporated into and moveable with the top wall, with the wireless charging unit being located immediately below the anti-slip surface whereby the mobile device is charged when placed on the anti-slip surface and is moveable with the top wall between the covered position and retracted position while being charged.

In another aspect, a console assembly is provided wherein the wireless charging unit includes a primary coil for inductively providing power to the mobile device, the wireless charging unit further including a power supply circuit coupled to the primary coil.

In a further aspect, a console assembly is provided wherein the anti-slip surface is flat and defines less than all of a top surface of the top wall.

In an additional aspect, a console assembly is provided wherein the anti-slip surface is bounded by a curved surface defining further portions of the top surface of the top wall.

In yet another aspect, a console assembly is provided wherein the curved surface circumscribes the anti-slip surface.

In still a further aspect, a console assembly is provided wherein the anti-slip surface is elevated in height relative to immediately adjacent portions of the curved surface.

In another aspect, a console assembly is provided wherein the curved surface is formed of a different material than material forming the anti-slip surface.

In a further aspect, a console assembly is provided with a receiving slot, the receiving slot being defined by a pair of second sidewalls and a second top wall generally extending between the second sidewalls, the top wall of the storage compartment defining a bottom wall of the receiving slot when in the retracted position, the anti-slip surface of the top wall of the storage compartment being spaced apart from the second top wall so as to define a receiving space whereby the mobile device can be retained on the anti-slip surface as the top wall is moved between the closed position and the retracted positions.

In still another aspect, a console assembly is provided wherein the receiving space has a height of at least 0.5 inches.

In yet another aspect, a console assembly is provided wherein the anti-slip surface is inclined relative to horizontal.

In further aspect, a console assembly is provided wherein the wireless charging unit defines a charging spot on the support surface.

In as still further aspect, a console assembly is provided wherein the charging spot is defined off-center relative to the top wall.

In an additional aspect, a console assembly is provided wherein the charging spot is defined off-center relative to the anti-slip surface.

In another aspect, a console assembly for an automotive vehicle and use with a mobile device is provided. The console assembly comprises: a storage compartment having a floor, a pair of sidewalls, and a pair of end walls defining a storage area within the storage compartment, the storage compartment also including a slidable tray operable to be slid between a covered position and a retracted position, wherein in the covered position the tray is in a position covering an upwardly oriented opening of the storage compartment and in the retracted position the tray is in a position permitting access into the storage compartment through the opening; an anti-slip surface configured to receive the portable electronic device thereon, the anti-slip surface being flat and being at least partially surrounded by an bounding surface, the anti-slip surface and the bounding surface forming portions of a top surface of the tray, the anti-slip surface further having a raised height relative to immediately adjacent portions of the bounding surface; and a wireless charging unit incorporated into and moveable with the tray, the wireless charging unit defining a charging spot on the anti-slip surface whereby the portable electronic device is charged when placed on the charging spot and is moveable with the top wall between the covered position and retracted position while being charged.

In another aspect, a console assembly is provided wherein the bounding surface completely circumscribes the anti-slip surface.

In a further aspect, a console assembly is provided wherein portions of the bounding surface are curved to a height relative to the anti-slip surface that is greater than the height of the anti-slip surface.

In an additional aspect, a console assembly is provided wherein the charging spot is located off-center in the tray.

In still another aspect, a console assembly is provided wherein the wireless charging unit includes a primary coil incorporated into the tray for inductively providing power to the mobile device, the wireless charging unit further including a power supply circuit coupled to the primary coil.

In yet another aspect, a console assembly is provided wherein the charging spot is defined by the primary coil.

In a still further aspect, a console assembly is provided wherein the anti-slip surface and the bounding surface are formed of materials having different coefficients of friction.

Further objects, features and advantages of this invention will become readily apparent to persons skilled in the art after a review of the following description, with reference to the drawings and claims that are appended to and form a part of this specification.

DETAILED DESCRIPTION

Figure 1:
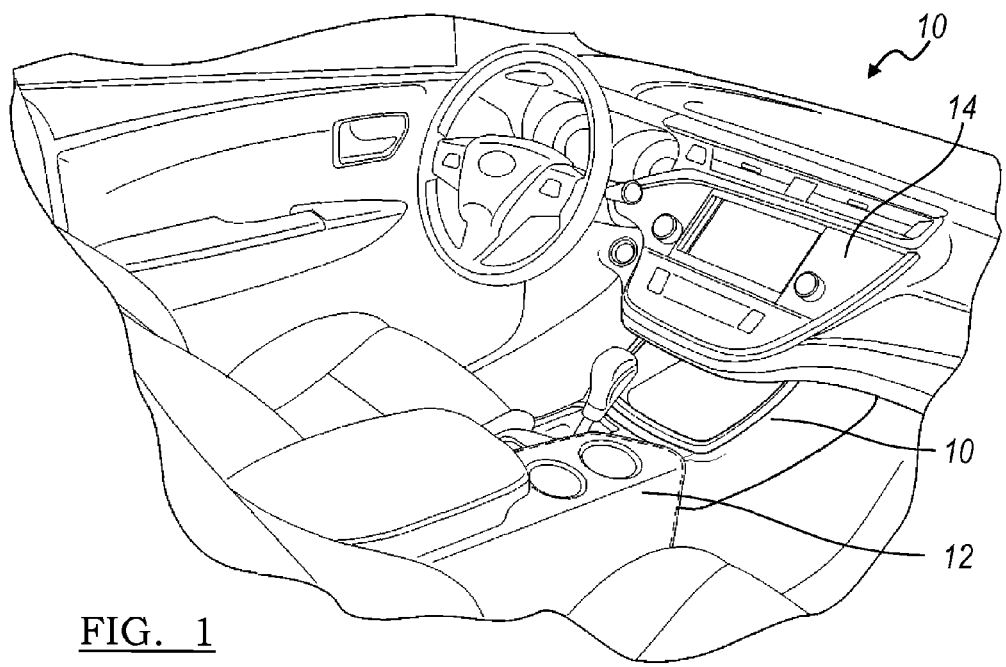
FIG. 1 is a perspective view of a center console in automobile and having a slidable support in accordance with the principles of the present invention.

Referring now to the drawings, a console assembly embodying the principles of the present invention is illustrated therein and designated at 10. The console assembly 10 is part of a center console 12, a console that is centrally located in the cabin of the vehicle. As seen in FIG. 1, the center console 12 extends longitudinally relative to the vehicle, and the console assembly 10 itself is positioned at the forward end of the center console 12, such that is located at least partially beneath the instrument panel 14. As will be apparent from the description which follows, the console assembly 10 could be formed as a separate component from the center console 12 or could be formed as part of the instrument panel 14. Additionally, the center assembly 10 could be positioned so as to be wholly beneath the instrument panel 14 or completely apart therefrom.

As used herein, directional indications such as forward, rearward, upward and downward are to be interpreted relative to an automotive vehicle. Accordingly, the forward direction refers to a direction toward the front end of the vehicle. Rearward, upward and downward directions are thus similarly defined as directions toward the rear, top and bottom, respectively, of the vehicle.

Figure 2:
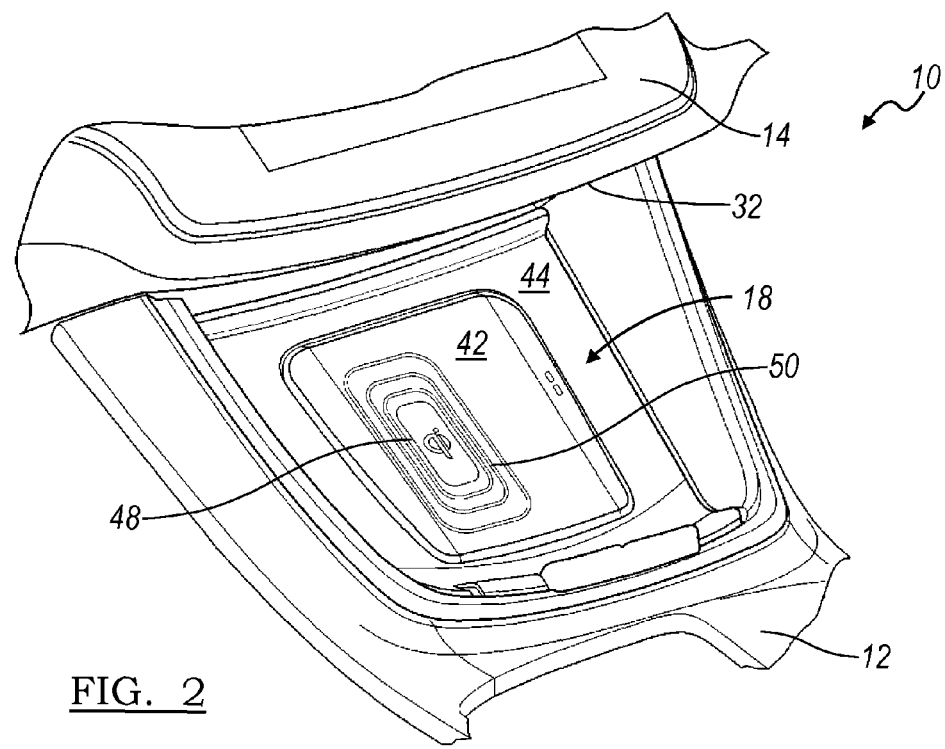
FIG. 2 is an enlarged perspective view of a portion of the center console, including the slidable support, seen in FIG. 1.
Figure 4:
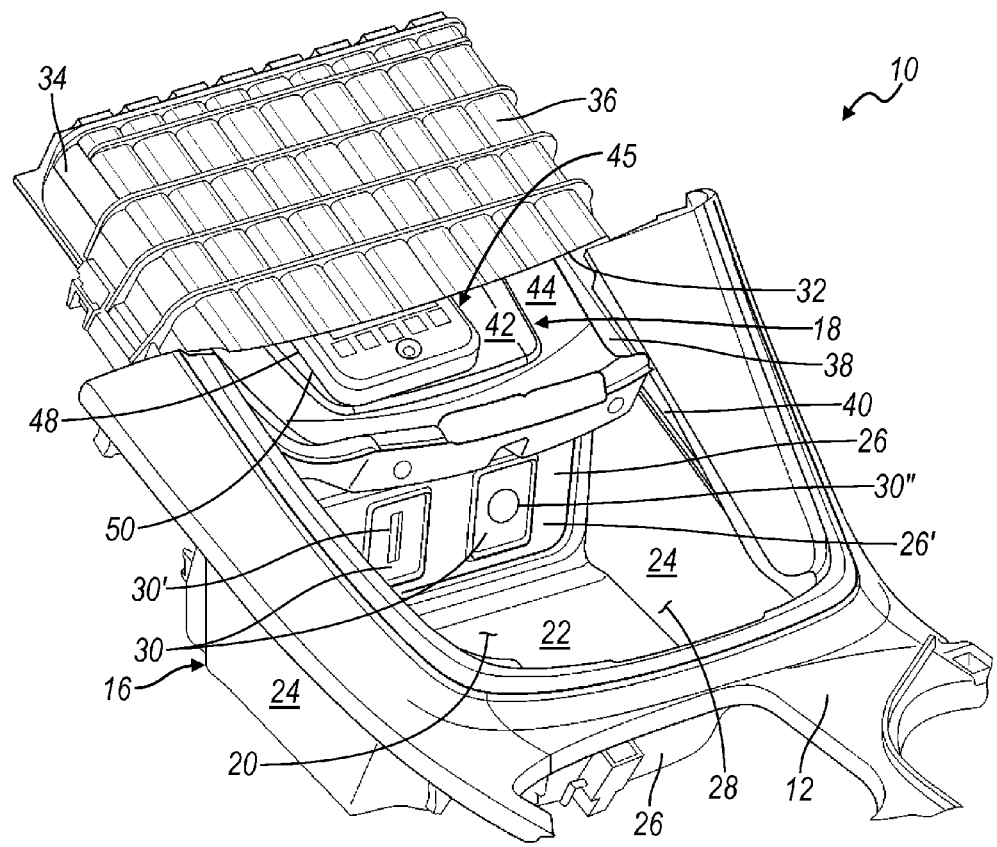
FIG. 4 is an enlarged perspective view, similar to that seen in FIG. 3, with the slidable support located in a retracted position.
Figure 5:
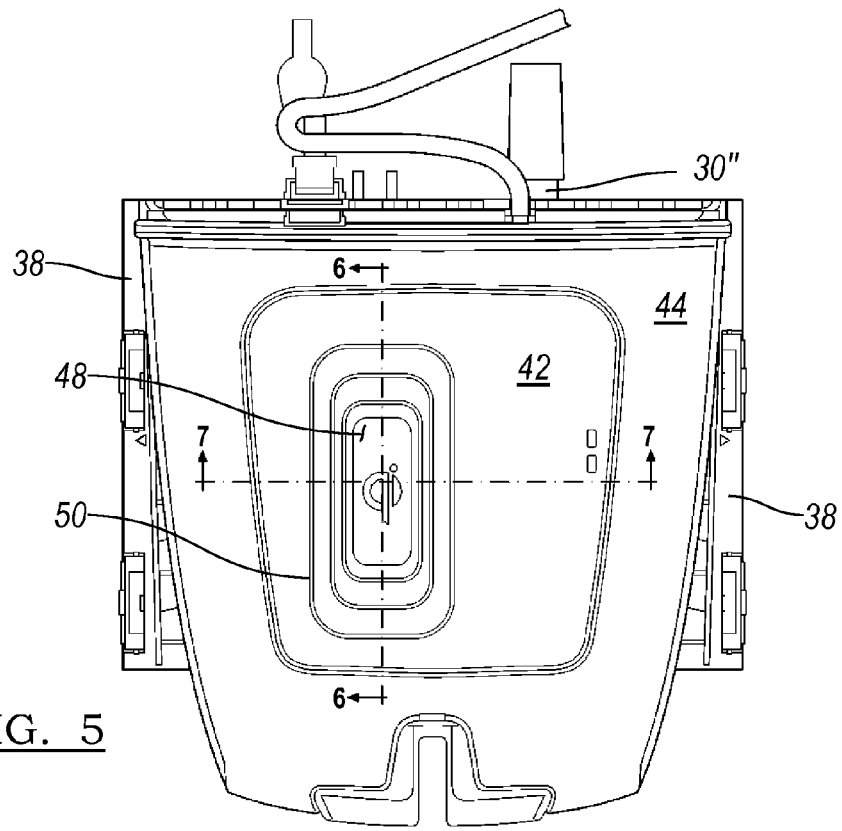
FIG. 5 is a plan view of the slidable support seen in FIGS. 2-4.

As its primary components, the console assembly 10 includes a storage compartment 16 and a slidable top wall or tray 18. The tray 18 is operable to be slid between a covered position and a retracted position relative to an opening in the storage compartment 16, the opening being one that permits access into a storage area 20 of the compartment 16. As seen in FIG. 2, the console assembly 10 is shown with the tray 18 in the covered position, whereby access to the storage area 20 is prevented. As seen in FIG. 4, the tray 18 has been moved to the retracted position and access into the storage area 20 of the storage compartment 16 is permitted.

The storage compartment 16 includes a floor 22, a pair of opposed sidewalls 24, and a pair of opposed end walls 26 that cooperatively define the storage area 20 therebetween. In the illustrated embodiment, the storage compartment 16 therefore includes an upwardly oriented opening 28, through which access into the storage area 20 is gained.

In one of the walls of the storage compartment 16, the storage compartment 16 is preferably provided with at least one connection port 30. As seen in FIG. 4, the front end wall 26' includes two connection ports 30. In this embodiment, one of the connection port 30' is configured as a USB port, while the other connection port 30" is configured as a 12 V power outlet. The connection ports 30 may be configured to provide power to a mobile device, such as, without limitation, a mobile phone, a personal digital assistant (PDA), a tablet computer, an electronic reader (e-reader) or other handheld electronic device. Alternatively, the connection ports 30 may allow for communication between the mobile device and one or more of the systems of the vehicle, such as the vehicle's entertainment, navigation or communication systems.

Figure 3:
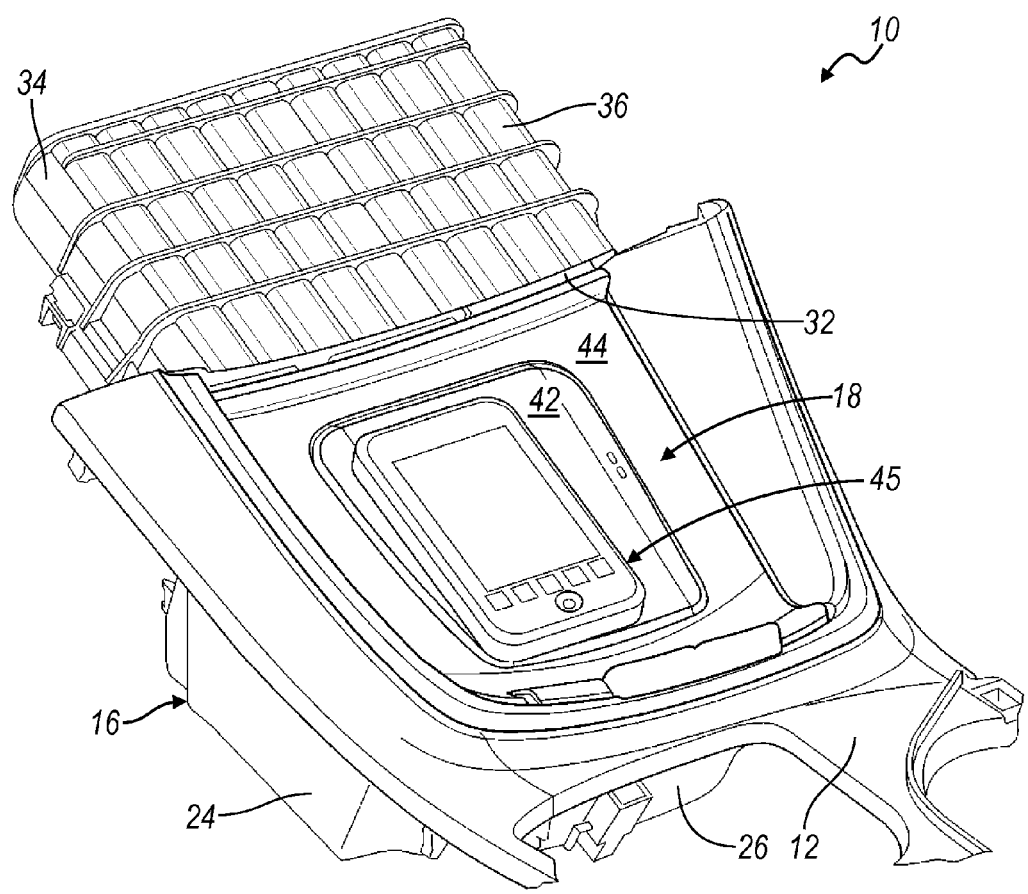
FIG. 3 is an enlarged perspective view similar that seen in FIG. 2 and further illustrating a portable electronic device, such as a mobile telephone, positioned on the slidable support.

As previously noted, the tray 18 is constructed such that it is movable between its closed and retracted positions. In its closed position, the tray 18 is positioned such that it completely extends over the opening 28 of the storage compartment 16. In the illustrated embodiment of FIGS. 2-4, the closed position is the position where the tray 18 has been extended or moved to its rearward most extent. When fully moved into its retracted position, the tray 18 is at its forward most extent, and the opening 28 of the storage compartment 16 is maximally exposed.

As seen in FIG. 4, when the tray 18 is in its retracted position, the tray 18 has been forwardly slid into a receiving slot 32 that is adjacent to the storage compartment 16. The receiving slot 32 may be formed as part of the console assembly 10 or, alternatively, either wholly or in part by a lower portion of the instrument panel 14. Regardless of the construction, the receiving slot 32 includes at least a pair of opposed sidewalls 34 with an upper wall 36 extending therebetween. The upper wall 36 is located such that the lowermost surface of the upper wall 36 is spaced apart from the upper surface of the tray 18, thereby providing sufficient clearance to allow the tray 18 to be moved into the receiving slot 32 without necessitating that a mobile device would need to be removed from the upper surface of the tray 18. In this regard, the lowermost surface of the upper wall 36 is preferably at least 0.5 inches, and more preferably at least 1.0 inches, above the upper surface of the tray 18.

In order to facilitate the sliding movement of the tray 18 relative to the remainder of the console assembly 10, the tray 18 includes side rails or runners 38 that reside and move within rail slots 40. In this regard, the rail slots 40 may be provided in the upper regions of the sidewalls 24 of the storage compartment 16. As one skilled in the art will appreciate, various alternative mechanisms could be used to facilitate this movement of the tray 18.

The upper surface of the tray 18 is a visible surface within the cabin of the automotive vehicle. Accordingly, it is desirable that the upper surface of the tray 18 have pleasing aesthetics. One manner in which pleasing aesthetics may be provided is to avoid providing sharp corners and transitions between a floor surface and any end/sidewall surfaces on the visible side of the tray 18. A softer look can therefore be provided when the upper surface of the tray 18 has a generally curved contour at the transitions between the floor surface and the end/sidewall surfaces. The upper surface of the tray 18, seen in FIGS. 2-4, includes such a curved contour at those transitions. Another way to achieve pleasing aesthetics is through choice of materials defining the visible surfaces of the tray 18. Soft-feel, leather-like materials are therefore desirable.

However, one problem with soft-feel, leather-like materials, is that when driving the vehicle, a mobile device resting on such a material will have the tendency to slide as the vehicle is accelerated, decelerated and/or turned. This problem also exists with harder, less soft and luxurious looking materials. To eliminate this movement of the mobile device during operation of the vehicle, one could employ a material having a greater coefficient of friction, such as rubber or silicone material. While that would facilitate retention of the mobile device, it would lack the pleasing aesthetics that are desired.

The tray 18 of the present console assembly 10 substantially eliminates inadvertent movement of a mobile device during operation of the vehicle by providing a distinctly defined, anti-slip surface 42, which is generally centrally located within upper surface of the tray 18. The anti-slip surface 42 is a substantially flat surface that readily allows for the placement of a mobile device thereon. A mobile phone is illustrated as resting on the anti-slip surface 42 of the tray 18 in both its closed and retracted positions.

The anti-slip surface 42 is formed of a material that establishes a coefficient of friction that prevents sliding or movement of the mobile device thereon when the device is subjected to loading of at least up to +/−4 G during operation of the vehicle. The material for the anti-slip surface 42 should achieve the above specification even while the tray 18 and its anti-slip surface 42 are inclined at an angle of at least up to 21.5°. As seen in the figures, the tray 18 of the console assembly 10 is provided at an inclined angle such that the forward end of the tray 18 is raised relative to the rearward end of the tray 18. Thus, the tray 18 is inclined upwardly in the forward direction. This upward inclination serves the purpose of allowing an occupant within the cabin of the vehicle to more readily see the display screen of a mobile device resting on the anti-slip surface 42. Since a specific coefficient of friction cannot be established without specifically knowing the material on the rear surface of the mobile device, the inventors have found that suitable material exhibit a surface hardness of up to 70 Shore A. Preferred materials include polyester (base) thermoplastic elastomers, and one preferred embodiment utilizes a polyester (base) thermoplastic elastomer with 59 Shore A hardness. Similar materials achieving the above mentioned criteria could alternatively be employed.

The anti-slip surface 42 is surrounded about its circumference by a bounding surface 44 designed to have enhanced aesthetics. The bounding surface 44 therefore may be a different material than that of the anti-slip surface 42. Achievement of these enhanced aesthetics may include not only the utilization of a material serving that purpose, but also the providing of a bounding surface 44 with smoothly curved contours, transitioning into upwardly extending end and sidewalls of the tray 18. Regarding the material of this bounding surface, the material preferably exhibits a coefficient of friction and Shore A hardness that is less than that of the anti-slip surface 42.

One inconvenience of relying upon or using a mobile device is that the device can and does run out of battery power and becomes inoperative. In order to allow for the powered use or charging of the battery of a mobile device, the device may be connected by way of a cord (not shown) to one of the previously mentioned connection ports 30. The tray 18 of the console assembly 10 incorporates an additional feature that allows one to forgo the use of a cord to connect and charge the mobile device.

In this regard, the tray 18 has incorporated therein a wireless charging unit 46. Wireless charging units of various types are known and, as such, will not be discussed in significant detail herein. One such wireless charging unit, however, is an inductive charging unit, which is illustrated with the present embodiments. With an inductive charging unit, a primary coil 47 is coupled to a charging circuit that energizes the primary coil 47 and results in the formation of an alternating electromagnetic field about the primary coil 47. A secondary coil (not shown), and associated circuitry (not shown), is provided in conjunction with the mobile device. By placing the mobile device such that the secondary coil is within the alternating electromagnetic field generated by the primary coil 47, an inductive coupling is formed between the primary and secondary coils. The alternating electromagnetic field induces an electrical current in the secondary coil resulting in the creation of enough electricity for the charging of the mobile device's battery, or for even powering some mobile devices. While described in connection with an inductive charging unit, the tray 18 of the console assembly 10 may incorporate other types of wireless charging units.

The wireless charging unit 46 therefore defines a charging spot 48 on the anti-slip surface 42, which may further be generally identified by indicia 50 provided on the anti-slip surface. In order to facilitate the most efficient wireless charging of the mobile device, the mobile device should be specifically located and registered on the charging spot 42. In the tray 18 of the illustrated embodiment, the charging spot 48 is purposefully positioned such that it is not centered within the tray 18 or the anti-slip surface 42. By offsetting the charging spot 48, additional room is created on the tray 18 and the anti-slip surface 42 to allow for other items to be placed thereon during operation of the vehicle, without interfering with the charging of the mobile device or its visibility to the occupant, or without having to partially or fully overlay an article on the mobile device. Preferably, the charging spot 48 is offset in at least a lateral direction toward the driver's side of the vehicle. Depending upon the country for which the vehicle was manufactured, this may be toward the left or right side of the vehicle.

In order for the inductive coupling to function optimally, the primary and secondary coils must be located within a certain proximity of each other. In other words, they must not be separated by too great of a distance. Once this distance is exceeded, the efficiency of the inductive coupling rapidly diminishes. Standards for inductive coupling specify that the distance between the coils be 2 mm, with variances of −0.25 mm and +0.5 mm.

As previously noted, the anti-slip surface 42 is encompassed by a bounding surface 44 that exhibits a curved transition into the end and sidewalls 24, 26 of the tray 18. Should a mobile device that is positioned over the charging spot be misaligned, it is possible that an end or corner of the mobile device may contact and reside on the curved transition of the bounding surface 44. This would in turn raise and elevate the lower or back side of the mobile device up off of the anti-slip surface 42. Depending upon the degree to which the mobile device is elevated, it is possible the secondary coil will be raised to a height where optimal coupling with the primary coil is no longer achieved, or even where no charging will occur.

Figure 6:
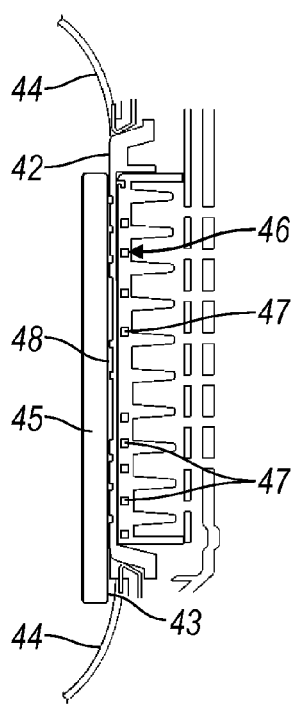
FIG. 6 is a cross-sectional view generally taken along line 6-6 in FIG. 5.
Figure 7:
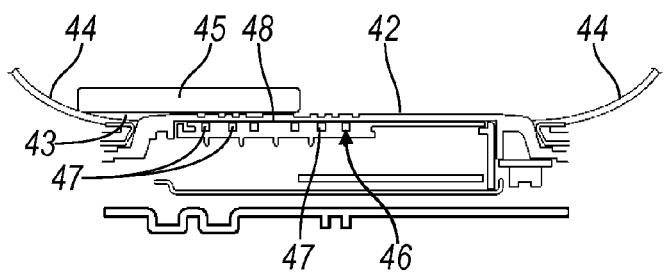
FIG. 7 is a cross-sectional view generally taken along line 7-7 in FIG. 5.

To minimize the possibility of the above situation occurring, the anti-slip surface 42 is provided such its substantially flat top surface exhibits a raised height relative to the immediately adjacent portions of the bounding surface 44. The raised height of the anti-slip surface 42, relative to the immediately adjacent portions of the bounding surface 44, can be seen in FIGS. 2-4, 6 and 7. With the anti-slip surface 42 being raised in this manner, the mobile device can be misaligned relative to the charging spot 48 and even extend off of the anti-slip surface 42, to a certain degree, without resulting an end or corner of the device coming into contact with the upward transition of the bounding surface 44. As particularly seen in FIGS. 6 and 7, a mobile device 45 overhangs and extends off (generally designated at 43) of the anti-slip surface 42 some distance without contacting the bounding surface 44. If the anti-slip surface 42 and the immediately adjacent portions of the bounding surface 44 were of the same height, the degree to which the mobile device 45 could be misaligned with the charging spot 48 before affecting the charging capabilities of the would be significantly lessened.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A console assembly for an automotive vehicle and for use with a mobile device, the console assembly comprising:
a storage compartment having a storage area defined by a floor, a pair of sidewalls, and a pair of end walls, the storage compartment having an opening permitting access in the storage area, the storage compartment also including a slidable top wall operable to be slid between a covered position and a retracted position relative to the opening, wherein in the covered position the top wall is in a position covering opening and in the retracted position the top wall is in a position permitting access into the storage area through the opening;
an anti-slip surface provided on the top wall and configured to receive the mobile device thereon; and
a wireless charging unit incorporated into and moveable with the top wall, the wireless charging unit having a charging spot on the support surface, the charging spot being purposefully positioned on the support surface and not centered thereon, the wireless charging unit being located immediately below the anti-slip surface whereby the mobile device is charged when placed on the anti-slip surface and is moveable with the top wall between the covered position and retracted position while being charged.

2. A console assembly according to claim 1, wherein the wireless charging unit includes a primary coil for inductively providing power to the mobile device, the wireless charging unit further including a power supply circuit coupled to the primary coil.

3. A console assembly according to claim 1, wherein the anti-slip surface is flat and defines less than all of a top surface of the top wall.

4. The console assembly according to claim 3, wherein the anti-slip surface is bounded by a curved surface defining further portions of the top surface of the top wall.

5. The console assembly according to claim 4, wherein the curved surface circumscribes the anti-slip surface.

6. The console assembly according to claim 4 wherein the anti-slip surface is elevated in height relative to immediately adjacent portions of the curved surface.

7. The console assembly according to claim 4, wherein the curved surface is formed of a different material than material forming the anti-slip surface.

8. The console assembly according to claim 1, further comprising a receiving slot, the receiving slot being defined by a pair of second sidewalls and a second top wall generally extending between the second sidewalls, the top wall of the storage compartment defining a bottom wall of the receiving slot when in the retracted position, the anti-slip surface of the top wall of the storage compartment being spaced apart from the second top wall so as to define a receiving space whereby the mobile device can be retained on the anti-slip surface as the top wall is moved between the closed position and the retracted positions.

9. The console assembly according to claim 8, wherein the receiving space has a height of at least 0.5 inches.

10. The console assembly according to claim 1, wherein the anti-slip surface is inclined relative to horizontal.

11. The console assembly according to claim 1, wherein the charging spot is defined off-center relative to the top wall.

12. The console assembly according to claim 1, wherein the charging spot is defined off-center relative to the anti-slip surface.

13. A console assembly for an automotive vehicle and for use with a mobile device, the console assembly comprising:
a storage compartment having a storage area defined by a floor, a pair of sidewalls, and a pair of end walls, the storage compartment having an opening permitting access in the storage area, the storage compartment also including a slidable top wall operable to be slid between a covered position and a retracted position relative to the opening, wherein in the covered position the top wall is in a position covering opening and in the retracted position the top wall is in a position permitting access into the storage area through the opening;
an anti-slip surface provided on the top wall and configured to receive the mobile device thereon; and
a wireless charging unit incorporated into and moveable with the top wall, the wireless charging unit having a charging spot on the support surface, the charging spot being purposefully positioned on the support surface, the wireless charging unit being located immediately below the anti-slip surface whereby the mobile device is charged when placed on the anti-slip surface and is moveable with the top wall between the covered position and retracted position while being charged.

* * * * *